(12) United States Patent
Hou et al.

(10) Patent No.: US 6,503,018 B2
(45) Date of Patent: Jan. 7, 2003

(54) STRUCTURE OF HANDLEBAR JOINT

(75) Inventors: Jen-En Hou, Chia-I Hsien (TW); Hung-Chung Hou, Chia-I Hsien (TW)

(73) Assignee: Link Treasure Limited, Tortola (VG)

( * ) Notice: Subject to any disclaimer, the term of this patent is extended or adjusted under 35 U.S.C. 154(b) by 99 days.

(21) Appl. No.: 09/808,185

(22) Filed: Mar. 15, 2001

(65) Prior Publication Data

US 2002/0131814 A1 Sep. 19, 2002

(51) Int. Cl.$^7$ .............................. F16D 3/10; B62B 7/00
(52) U.S. Cl. ........................... 403/97; 403/104; 16/436; 280/47.371
(58) Field of Search .............................. 403/43, 95, 97, 403/102, 104; 16/436, 901, 115; 280/47.371, 47.36, 47.38

(56) References Cited

U.S. PATENT DOCUMENTS

| | | | | |
|---|---|---|---|---|
| 5,039,118 A | * | 8/1991 | Huang | 280/47.371 |
| 5,056,805 A | * | 10/1991 | Wang | 280/47.371 X |
| 5,168,601 A | * | 12/1992 | Liu | 16/126 |
| 5,184,835 A | * | 2/1993 | Huang | 280/47.371 |
| 5,535,483 A | * | 7/1996 | Cabagnero | 16/115 |
| 5,769,447 A | * | 6/1998 | Huang | 280/47.38 X |
| 6,315,309 B1 | * | 11/2001 | Li et al. | 280/47.38 |

* cited by examiner

Primary Examiner—Robert J. Sandy
(74) Attorney, Agent, or Firm—Birch, Stewart, Kolasch & Birch, LLP

(57) ABSTRACT

A handlebar joint, comprises a disc seat, a rotating disc and a clutch disposed between both of them and having flexible element that passes through a handlebar. In a normal coupling position, the two end of the clutch is coupled to the disc seat and the rotating disc so as to keep the handlebar relatively unmoved; and in the releasing position, the clutch does not couple with the disc seat, therefore, the handlebar can be bent. Also, in the coupling position, when the movements of the flexible element are executed, the clutch can be rotated to drive the deflectable element, so the movements cannot be influenced when the handlebar is bent.

12 Claims, 9 Drawing Sheets

STRUCTURE OF HANDLEBAR JOINT

FIELD OF THE INVENTION

The present invention relates a structure of handlebar joint, more particularly, to a structure of handlebar joint which does not influence the movements of deflectable members disposed in the handlebar of a stroller.

BACKGROUND OF THE INVENTION

The stroller is a carriage designed for carrying and moving an infant. One of the conventional strollers is a collapsible stroller, which can reduce the occupied space on shipping and storing.

The conventional collapsible strollers have various styles. But when they are unused, the strollers have both functions of folding and expanding in order to reduce occupied space on shipping and storing. The frame of a stroller includes front leg tubes, rear leg tubes, handlebars and support tubes (as FIG. 1 shown, but without handlebar joint in handlebar). The rear leg tube and handlebar pivot at the first joint, and the front leg tube pivot at the second joint, meanwhile, Deflectable transmission members are disposed in the handlebar. A switch, also disposed on the handlebar, is connected to the element so as to be pressed to release the locking relation between the first joint and second joint to fold the stroller. But such kind of design only resolves the space problem of the stroller. To the adjustable bending angle of the handlebar utilized for a user to hold more comfortable in use, the design is still very primitive.

Some kinds of strollers might provide the function for adjusting the fold angle of the handlebar, but they either have not the pre-mentioned collapsible design or influence the folding movements so that mistake movements will probably happen in folding the stroller when the bending of the handlebar is adjusted. When it happens, the baby seated in the stroller will be endangered.

Also, in the same situation, to the design of a brake, a stroller, which has both of the brake and the bendable handlebar in that a deflectable member for transmission is disposed, is still can't be seen in the market up to the present.

SUMMARY OF THE INVENTION

The main object of the present invention is to provide a structure of handlebar joint, enabling a handlebar of a stroller to be bent and the movements of deflectable members in the handlebar are not influenced.

The structure of handlebar provided in the present invention, enabling a operation section and support section thereof to be connected and bent, comprises a disc seat, a rotating disc and a clutch; the clutch, which has a releasing position and normal coupling position, is disposed between the disc seat and the rotating disc. The two ends of the clutch are coupled to the disc seat and the rotating disc so as to keep the disc seat and rotating disc relatively unmoved (the handlebar can not be bent) at the normal coupling position. And, when a button disposed at the axial center of the disc seat is pressed, the button drives the clutch to move to the releasing position to separate form the disc seat. The clutch only couples to the rotating disc at that time, so the disc and rotating disc can move relatively (the handlebar can be bent), and the bending angle of the handlebar can be adjusted. The clutch is back to the coupling position after the button is released. The clutch can be rotated to move the flexible element, the movements of the deflectable is not influenced on bending the handlebar.

DETAILED DESCRIPTION OF THE PREFERRED EMBODIMENTS

Figure 1:
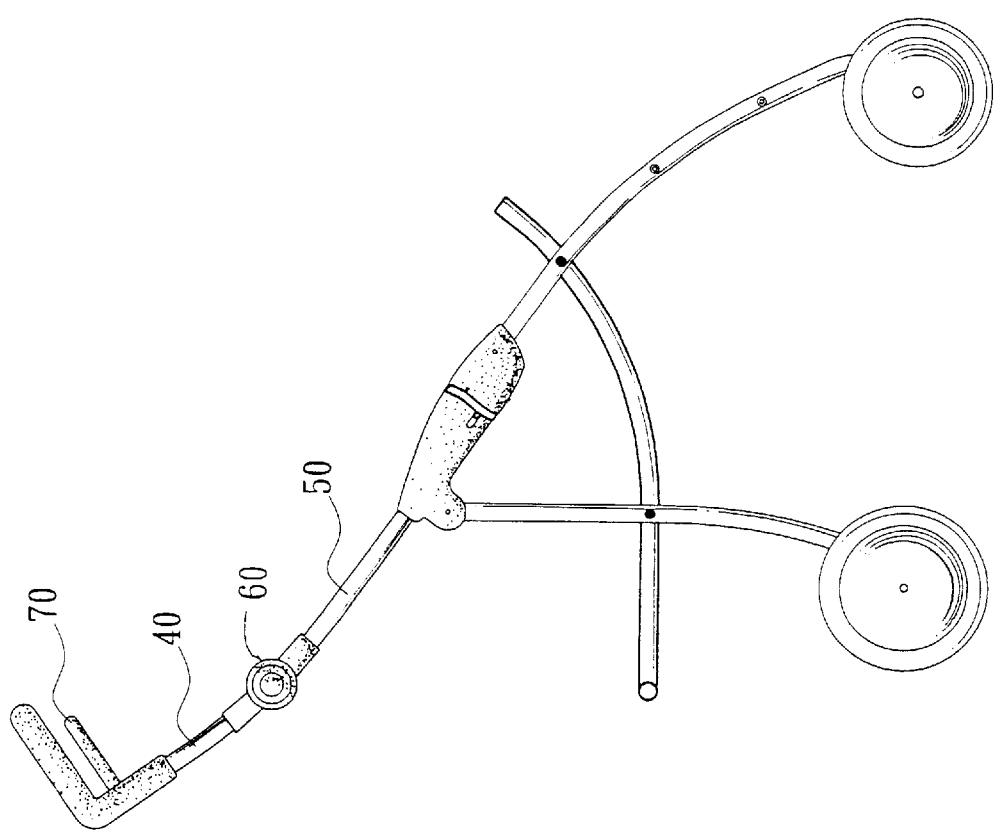
FIG. 1 is a diagram of a preferred embodiment of the present invention.
Figure 2:
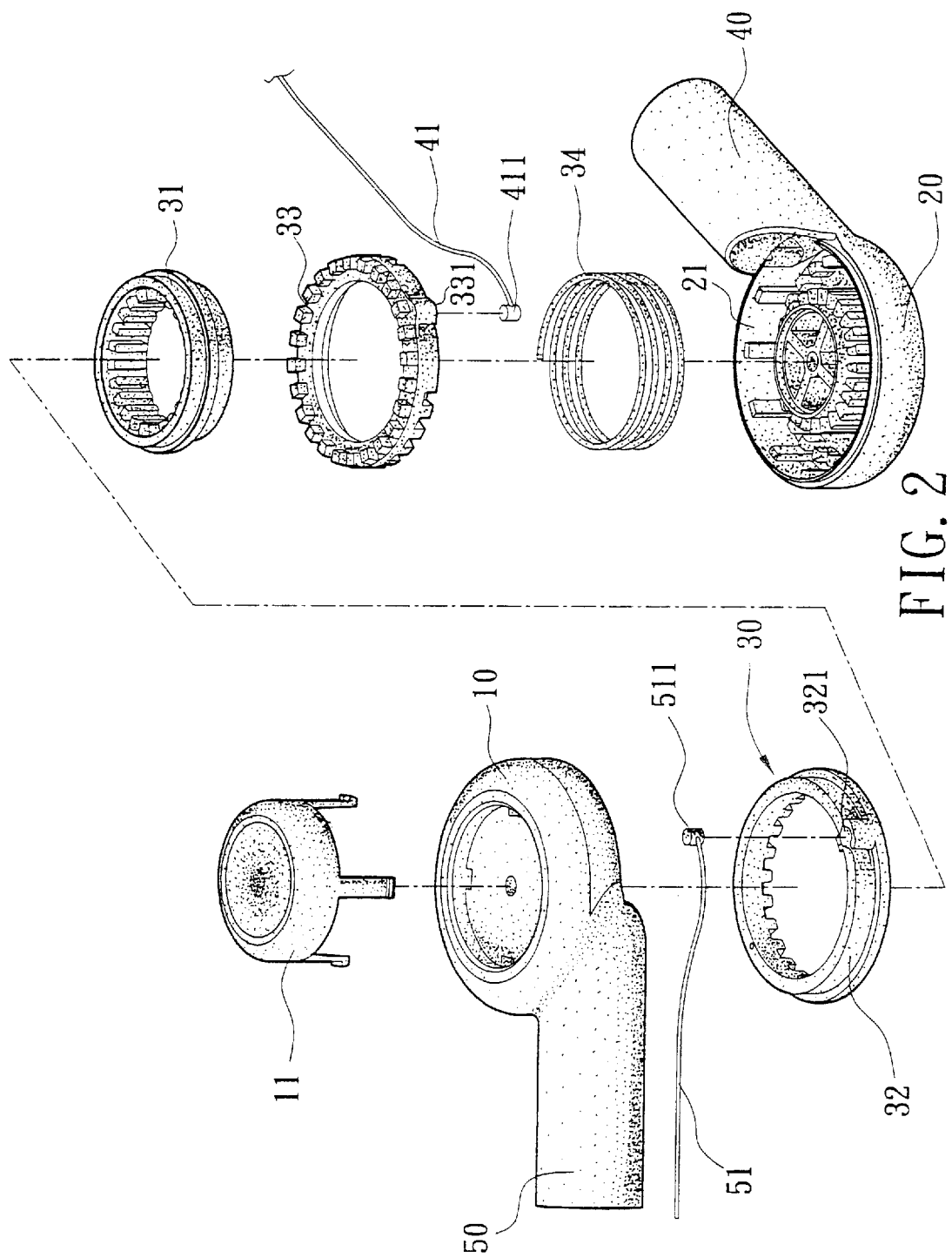
FIG. 2 is an explosive view of a preferred embodiment of the present invention.
Figure 9:
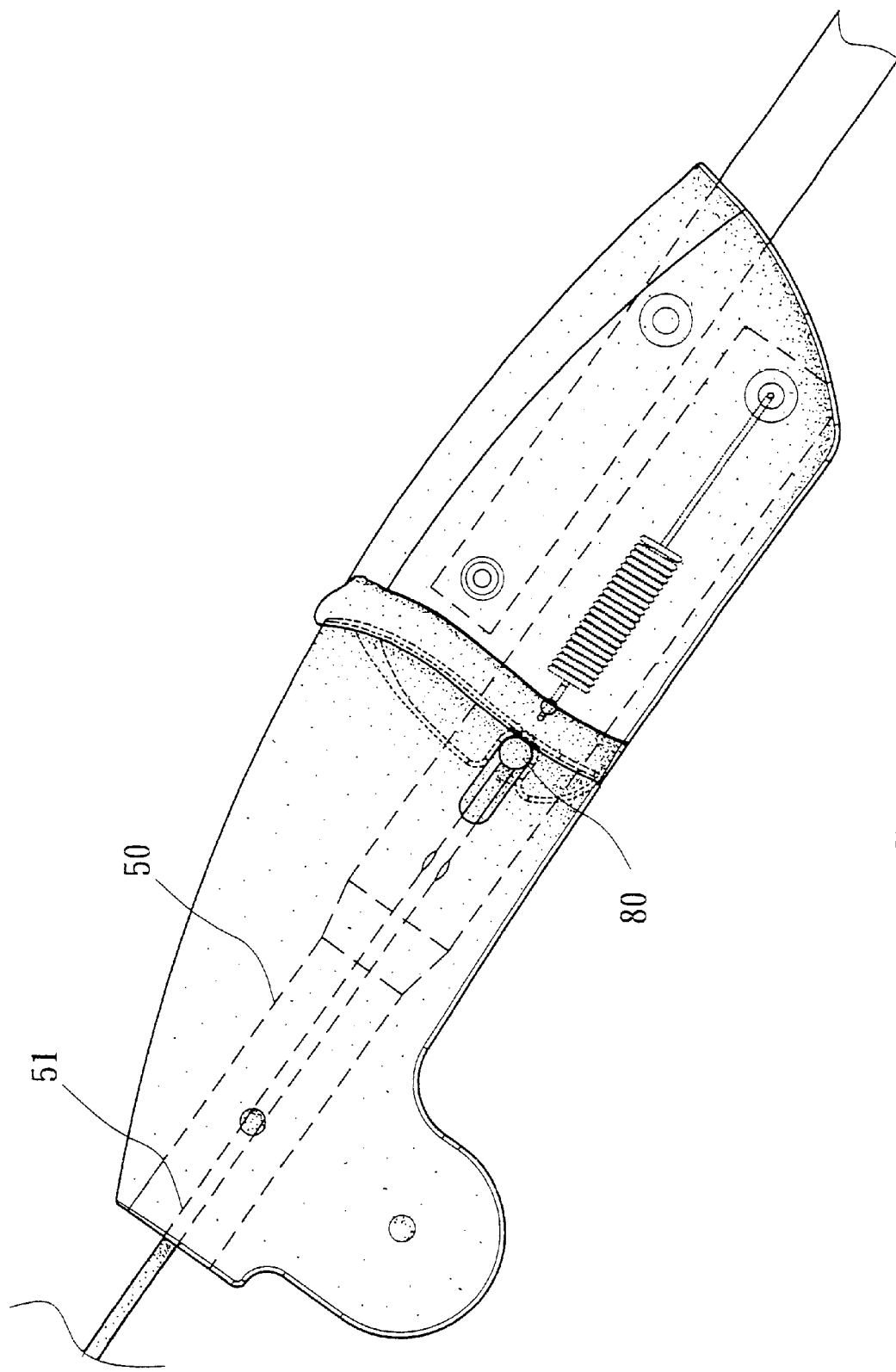
FIG. 9 is a diagram of a preferred embodiment of the present invention, showing a passive element to be a wedging tenon.

As FIGS. 1 and 2 shown, a structure of a handlebar joint in accordance with the present invention is disposed at a handlebar of a stroller, it comprises a disc seat 10, a rotating disc 20 and a clutch 30 and is utilized to connect an operation section 40 and a supporting section 50 so as to bend them relatively to each other. And, a flexible element 41 and 51, which detour the handlebar joint, are disposed in the operation section 40 and the supporting section 50 respectively, they mutually drive a operating element and a passive element as FIG. 9 shown, wherein the operating element is a brake controller and the passive element is a brake, or the operating element is a grip 70 and the passive element is a movable wedging tenon.

The disc seat is disposed at the supporting section, it comprises a first coupling hole 12 and a button 11 is installed at the axial center thereof. The first coupling hole 12 faces to the rotating disc 20 and has an axis same as the one of button 70, and a tooth and a stopping member 121 are disposed therein as FIG. 3 shown.

The rotating disc, having a second coupling hole 21, is disposed at the operation section 40 and pivoted to the disc seat 10 at the same axis to rotate around the axial center thereof. Therefore, the operation section 40 and the supporting section 50 of the handlebar can make a relative bending. The second coupling hole 21 faces to the disc seat 21, has the same axis with the button 11 and a tooth is disposed therein.

The clutch 30, which is at the coupling position during the normal period, can move to a releasing position. It comprises a slide element 31, a first rotating element 32, a second rotating element 33 and a elastic element 34, where the slide element 31, the second rotating element 32 and elastic element can be moved axially along the axis of the button 11. And the first rotating element 32 is connected at the one end of the flexible element 51 that connect with the passive element at another end thereof, and utilizes the stopping member 121 put it to be rotatably disposed in the disc seat and to rotate freely around the sliding element 31. The button 11 is installed in the first rotating element 32 and presses against the sliding element 31. Also, the shape of the second rotating element 33 is symmetrical to the one of the second coupling hole and can rotate freely around the sliding element 31 and is connected to the one end of the flexible element 41 that connects with the operating element at the another thereof. The elastic element 34 is installed between the rotating disc 20 and the rotating element 33. The first and second rotating element 32 and 33 have a wedging groove 321 and 331 respectively, enabling a wedging tip 411 and 511, which are disposed at the one end of the flexible element 41 and 51 and conforms to them respectively, to be wedged in them respectively so that the deflectable element 41 and 51 can move with the first and second rotating element 32, 33.

Figure 3:
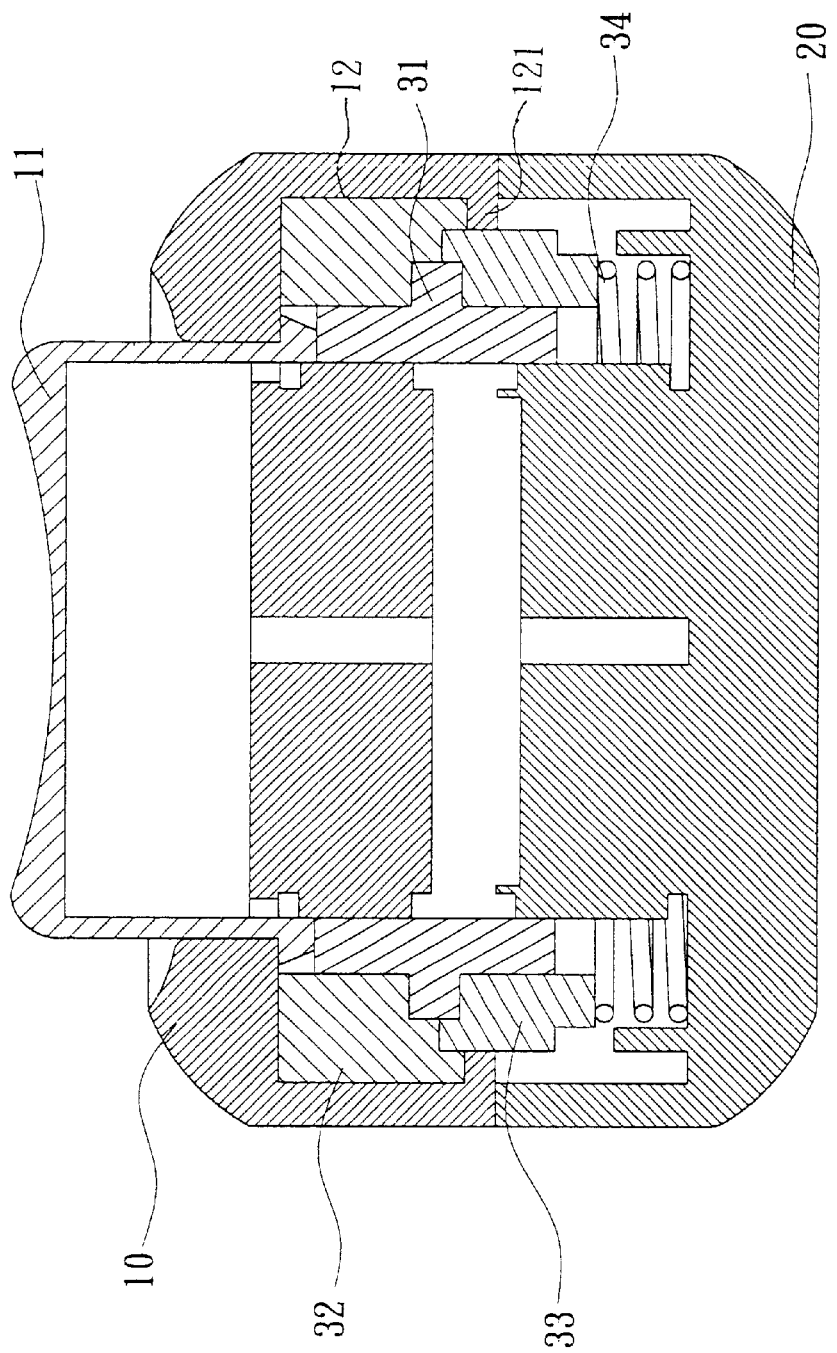
FIG. 3 is a sectional view of a preferred embodiment of the present invention, showing a clutch at a coupling position.
Figure 4:
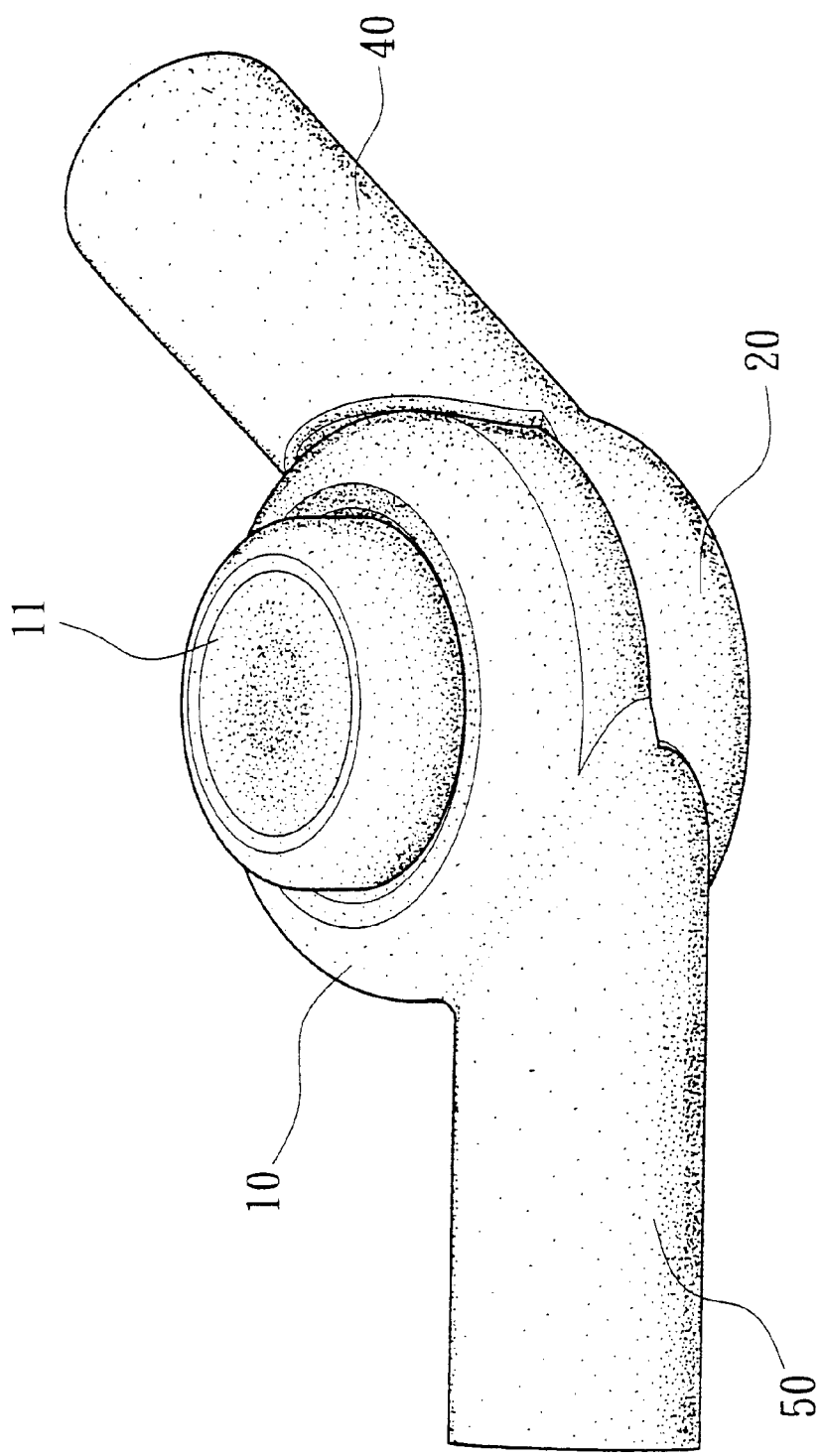
FIG. 4 is a diagram of a preferred embodiment of the present invention, showing a handlebar to be bent an angle while a clutch is at a coupling position.

As FIGS. 3 and 4 shown, at the normal coupling position, the two sides are coupled to the disc seat 10 and rotating disc 20 respectively, therefore, the disc seat 10 and the rotating disc 20 can be kept in a relatively unmoved relation (i.e. the operation section 40 and supporting section 50 can be kept in a relatively unmoved relation). The first rotating element 32 and the second rotating element 33 axially cover the outer circumference side of the slide element 31, and the tooth at the bottom end of the first rotating is engaged to the tooth at the corresponding upper side of the second rotating element 33, and the lower side of the second rotating element leans against the elastic element 34 so that the second rotating element 33 and the slide element 31 can be kept at the normal coupling position due to the spring force of the elastic element 34.

Figure 5:
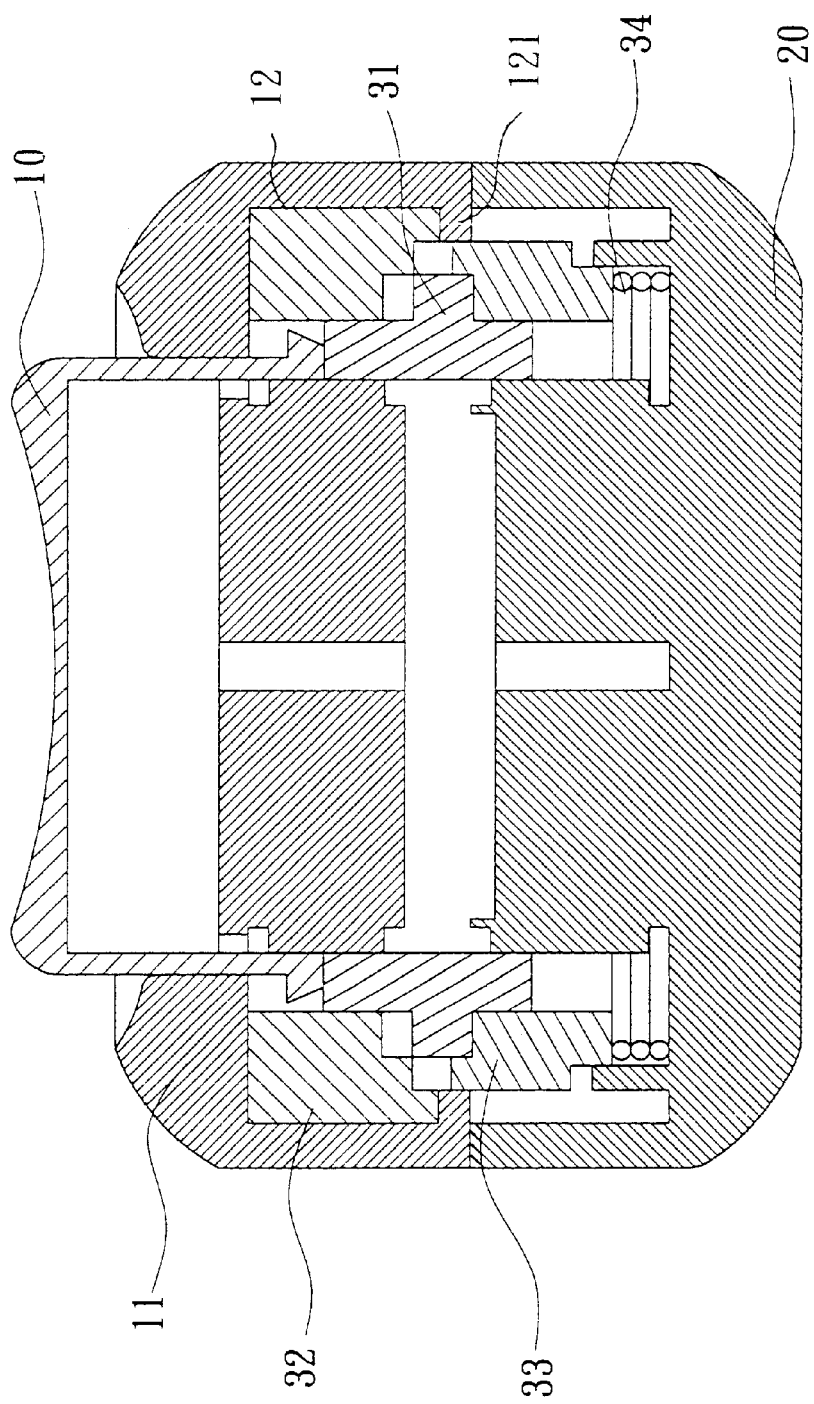
FIG. 5 is a sectional view of a preferred embodiment of the present invention, showing a clutch at a releasing position.
Figure 6:
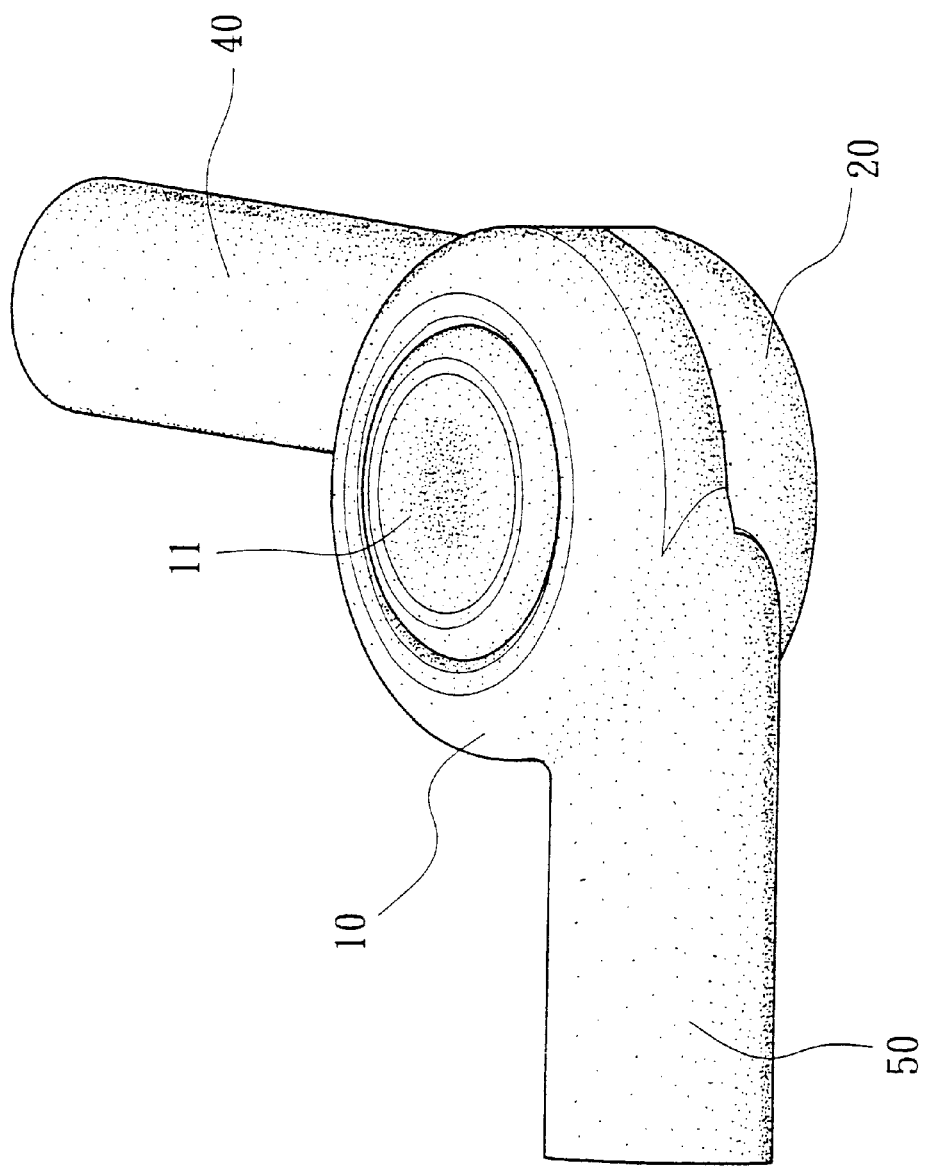
FIG. 6 is a diagram of a preferred embodiment of the present invention, showing a handlebar to be bent another angle while a clutch is at a releasing position.

As FIGS. 5 and 6 shown, when press down the button 11, the button will drive the slide element 31 together with the second rotating element 33 to move to approach to the rotating disc 20 until both of then are pushed into the second coupling hole, enabling one end of the both to engage with the second coupling hole 21. At that time, the first rotating element will not engage with the second rotating element 33, and the slide element 31 will separate from the first coupling hole 12 to reach the releasing position. Meanwhile, the disc seat 10 and the rotating disc 20 can be rotated relatively (i.e. the operation section 40 and the supporting section 50 can be bent relatively, compare FIG. 4 with FIG. 6).

Figure 7:
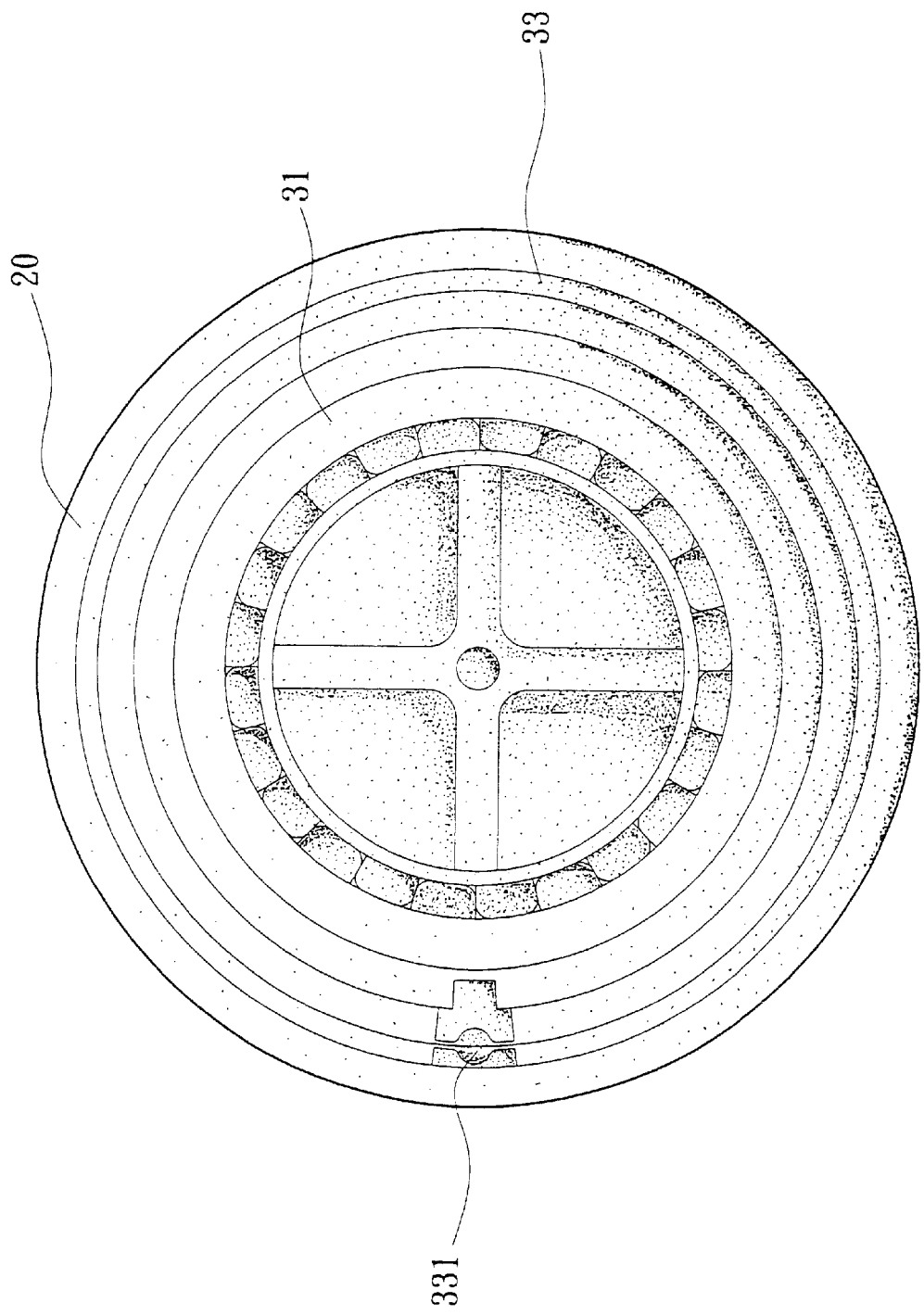
FIG. 7 is a diagram of a preferred embodiment of the present invention, showing a clutch to be bent an angle.
Figure 8:
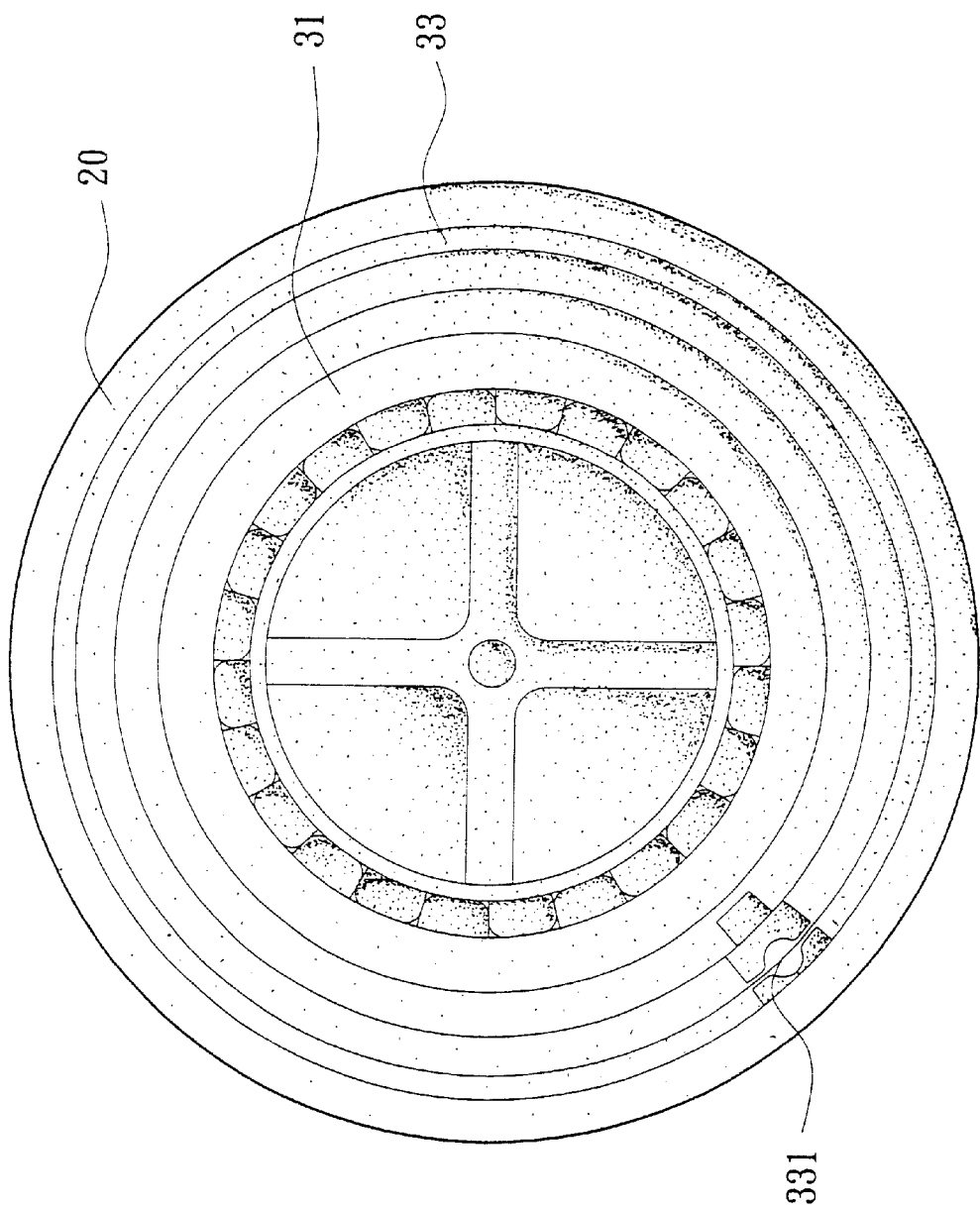
FIG. 8 is a diagram of a preferred embodiment of the present invention, showing a clutch to be bent another angle.

As shown in FIGS. 7 and 8, when execute the movements of the deflectable element, must press the operating element first, enabling the deflectable element connected to the operating element to be extended to drive the second rotating element together with the first rotating element to move. Therefore, the flexible element 51 connected to the passive element is also extended so as to drive the passive element to move, enabling the joint 60 of the stroller, as shown in FIG. 1, to rotate. And, the elastic element connected to the operating element (not shown in the figures) will return the second rotating element 33 and slide element back the coupling position by elastic force.

It is to be understood that the drawing is designed for purpose of illustration only, and is not intended for use as a definition of the limits and scope of the invention disclosed.

What is claimed is:

1. A structure of handlebar joint, utilized to connect an operating section and a supporting section of a handlebar, said operating section and supporting section can bend relatively, said handlebar joint comprising:

a disc seat disposed at said supporting section, having a button disposed at the axial center position thereof;

a rotating disc disposed at said operating section, pivoted to said disc seat at the same axis and being able to rotating around the axial center of said disc seat; and a clutch, comprising
      a slide element, being able to be pushed to a releasing position by said button, and being in coupling position at normal state, two ends thereof being coupled to said disc seat and said rotating disc respectively, enabling said disc seat and said rotating disc to be kept at relatively unmoved relation, and only one end being coupled to said rotating disc in the releasing position;
      a first rotating element, disposed rotatably in said disc seat, covering on one side of said slide element along the same axial center so that said first rotating element can rotate around the axial center of said slide element freely, said first rotating element further drive a passive element to move through a first flexible element;
      a second rotating element, covered another side of said slide element along the same axial center, in said coupling position, one end thereof engaging with the adjacent end of said first rotating element, said second rotating element together with said slide element being driven to move to said releasing position by said button so as to separate from said first rotating element and engage with said rotating disc, enabling said disc seat and said rotating disc to be able to rotate relatively, said second rotating element further connecting with a operating element through a second flexible element; and
      an elastic element, keeping said slide element and said second rotating element in said coupling position at normal state.

2. The structure of claim 1, wherein said disc seat further comprises a first coupling hole, faces to said rotating disc, has the same axis as said button, and a stopping element to dispose said first rotating element in said disc seat.

3. The structure of claim 2, wherein said first coupling hole has a tooth, and a corresponding tooth is disposed in said slide element, enabling said slide element and said disc seat to couple together.

4. The structure of claim 1, wherein said rotating disc further comprising a second coupling hole, faces to said disc seat, shape thereof is symmetrical to said second rotating element and has the same axis as said button, enabling said second rotating element to engage with said second coupling hole in releasing position.

5. The structure of claim 4, wherein said second coupling hole has a tooth, and said second rotating element has a tooth to conform to said second coupling hole so as to engage with said rotating disc in releasing position.

6. The structure of claim 4, wherein said second coupling hole has a tooth, and said slide element has corresponding tooth therein to conform to said second coupling hole, enabling said slide element to couple with said rotating disc.

7. The structure of claim 1, wherein said first rotating element further comprises a wedging groove, one end of said first flexible element connected to said passive element further comprised a wedging tip, which is corresponding to said wedging groove, enabling said first flexible element to connect with said first rotating element.

8. The structure of claim 1, wherein said second rotating element further comprises a wedging groove, one end of a flexible element connected to said operating element further comprised a wedging tip, which is corresponding to said wedging groove, enabling said second flexible element to connect with said second rotating element.

9. The structure of claim 1, wherein said elastic element is a compressing spring.

10. The structure of claim 1, wherein said operating element is a brake manipulator, and said passive element is a brake.

11. The structure of claim 1, wherein said operating element is a grip, and said passive element is a movable tenon.

12. The structure of claim 1, wherein said elastic element is installed between said second rotating element and said rotating disc.

* * * * *